(12) United States Patent
Buskens et al.

(10) Patent No.: US 7,707,451 B2
(45) Date of Patent: Apr. 27, 2010

(54) METHODS AND DEVICES FOR RECOVERING FROM INITIALIZATION FAILURES

(75) Inventors: Richard Wayne Buskens, Robbinsville, NJ (US); Oscar Gonzalez, Bridgewater, NJ (US); Yansong Ren, Eatontown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1263 days.

(21) Appl. No.: 11/167,188

(22) Filed: Jun. 28, 2005

(65) Prior Publication Data

US 2006/0294507 A1   Dec. 28, 2006

(51) Int. Cl.
    *G06F 11/00* (2006.01)
(52) U.S. Cl. ............... 714/2; 714/13; 714/15; 712/231; 706/19
(58) Field of Classification Search ......... 714/2, 714/5, 13, 15; 706/19, 45; 712/231
    See application file for complete search history.

(56) References Cited

U.S. PATENT DOCUMENTS

| | | | | | |
|---|---|---|---|---|---|
| 3,654,448 | A * | 4/1972 | Hitt | ............... | 714/17 |
| 5,027,269 | A * | 6/1991 | Grant et al. | ............... | 709/224 |
| 6,117,180 | A * | 9/2000 | Dave et al. | ............... | 703/20 |
| 6,151,607 | A * | 11/2000 | Lomet | ............... | 707/202 |
| 6,260,190 | B1 * | 7/2001 | Ju | ............... | 717/156 |
| 6,298,451 | B1 * | 10/2001 | Lin | ............... | 714/4 |
| 6,363,494 | B1 * | 3/2002 | Farah | ............... | 714/2 |
| 6,545,507 | B1 * | 4/2003 | Goller | ............... | 326/93 |
| 6,742,141 | B1 * | 5/2004 | Miller | ............... | 714/26 |
| 6,873,796 | B1 * | 3/2005 | Nakahira | ............... | 398/51 |
| 6,892,331 | B2 * | 5/2005 | Da Palma et al. | ............... | 714/55 |
| 7,206,805 | B1 * | 4/2007 | McLaughlin, Jr. | ............... | 709/203 |
| 7,222,133 | B1 * | 5/2007 | Raipurkar et al. | ............... | 707/200 |
| 7,298,208 | B2 * | 11/2007 | Nodake | ............... | 330/141 |
| 7,353,285 | B2 * | 4/2008 | Bai et al. | ............... | 709/235 |
| 7,363,633 | B1 * | 4/2008 | Goldick et al. | ............... | 719/328 |
| 7,447,710 | B2 * | 11/2008 | Sampath et al. | ............... | 707/202 |
| 7,554,930 | B2 * | 6/2009 | Gaddis et al. | ............... | 370/254 |
| 2002/0178349 | A1 * | 11/2002 | Shibayama et al. | ............... | 712/235 |
| 2003/0145246 | A1 * | 7/2003 | Suemura | ............... | 714/2 |
| 2003/0154423 | A1 * | 8/2003 | Egolf et al. | ............... | 714/15 |
| 2003/0221124 | A1 * | 11/2003 | Curran et al. | ............... | 713/201 |
| 2004/0025152 | A1 * | 2/2004 | Ishizaki et al. | ............... | 717/159 |
| 2004/0078628 | A1 * | 4/2004 | Akamatu et al. | ............... | 714/4 |
| 2004/0216095 | A1 * | 10/2004 | Wu | ............... | 717/151 |
| 2006/0041582 | A1 * | 2/2006 | Hekmatpour | ............... | 707/102 |
| 2006/0090094 | A1 * | 4/2006 | McDonnell et al. | ............... | 714/4 |
| 2006/0117100 | A1 * | 6/2006 | Ogawa et al. | ............... | 709/223 |
| 2006/0218551 | A1 * | 9/2006 | Berstis et al. | ............... | 718/102 |
| 2006/0236151 | A1 * | 10/2006 | Costlow et al. | ............... | 714/16 |
| 2006/0250981 | A1 * | 11/2006 | Li et al. | ............... | 370/254 |

\* cited by examiner

*Primary Examiner*—Joshua Lohn
*Assistant Examiner*—Loan Truong
(74) *Attorney, Agent, or Firm*—John E. Curtin

(57) ABSTRACT

The time it takes to recover from a system initialization failure may be reduced by determining whether to enable a recovery process immediately, or defer such a process. Sometimes it is desirable to defer a recovery process until certain interdependencies between system components are satisfied.

3 Claims, 6 Drawing Sheets

Interdependency graph

```
ComputeRecoveryGraph(G,{FailedEntities})
// FailedEntities: set of failed entities
// OD(Ti,Tj): true if the dependency
//    from task Ti to task Tj in original
//    interdependency graph is an operational
//    dependency
// R(v,e): recovery graph
// R(v): set of tasks in recovery graph
// R(e): dependency arcs in recovery graph
0.    R(v) := φ;
1.    ∀ entities e ∈ FailedEntities
1.1.     ∀ tasks Ti associated with e
1.1.1.      R(v) := R(v) ∪ Ti;
2.    ∀ unfinished tasks Ti associated with fault-free entities
2.1.     IdentifyCompletedTasksToReExec(R,Ti);
3.    ∀ unfinished tasks Ti such that Ti ∉ R
3.1.     R(v) := R(v) ∪ Ti;
4.    R(e) := all edges from original interdependency graph
      corresponding to tasks in R(v);

IdentifyCompletedTasksToReExec(R,Ti)
// Ti: current execution task associated with
//     a fault-free entity
1.    if ∃ Tj ∉ R such that OD(Tj,Ti)
1.1.     if ∃ Tk ∈ R such that OD(Tk,Tj)
1.1.1.      R := R ∪ Tj;
1.2    else
1.2.1     IdentifyCompletedTasksToReExec(R,Tj);
2.    if ∃ Tj ∈ R such that OD(Tj,Ti)
2.1.     R(v) := R(v) ∪ Ti;
```

FIG. 3

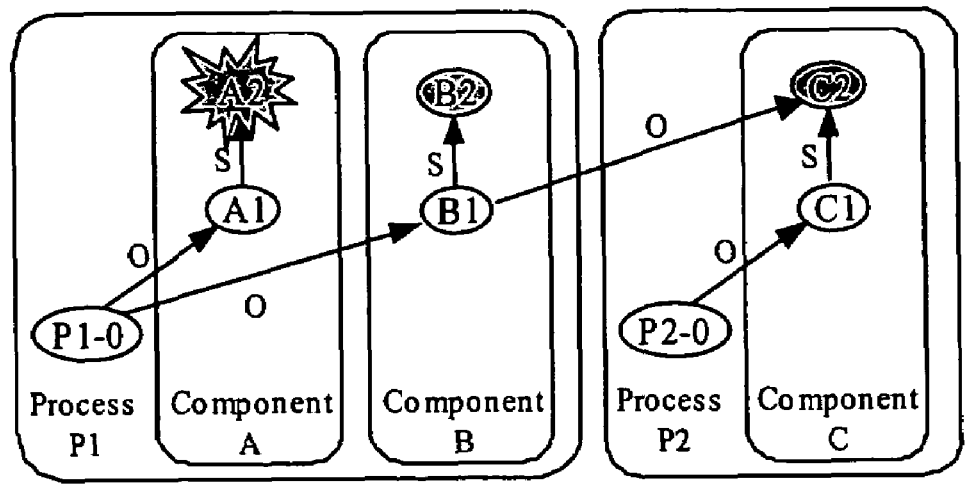
(a) Interdependency graph
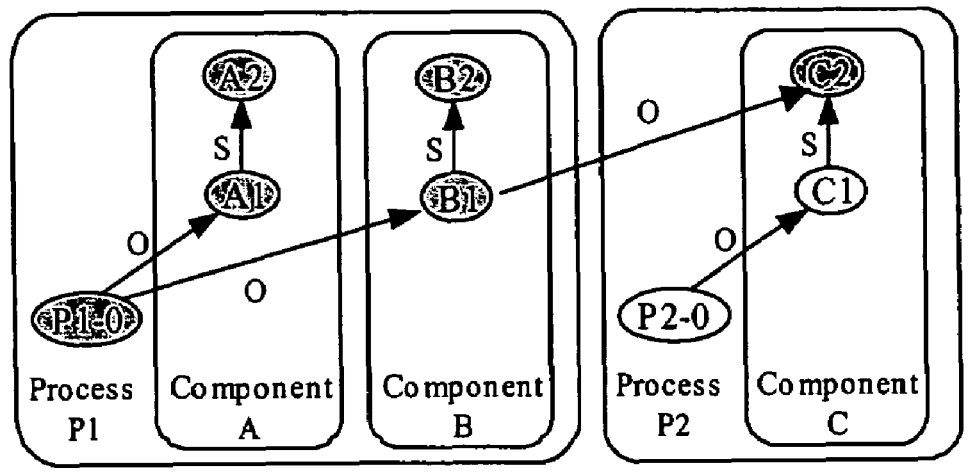
(b) Recovery graph for immediate recovery
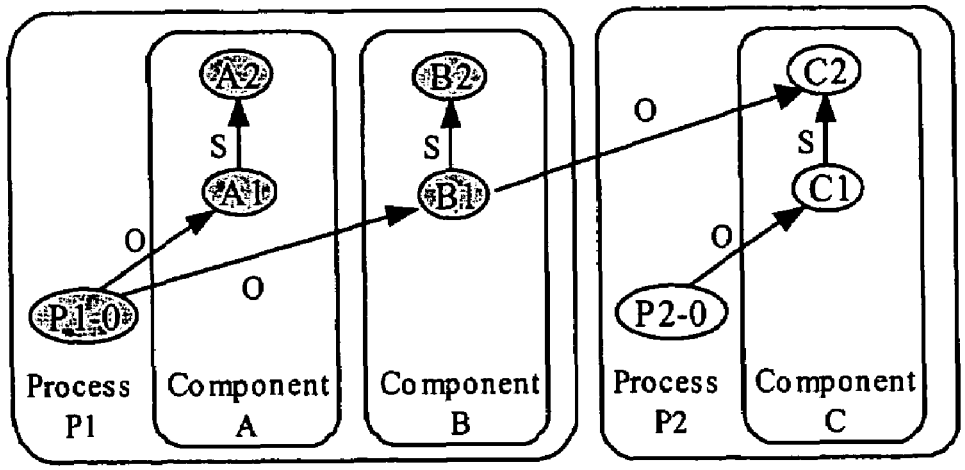
(c) Recovery graph for deferred recovery
FIG. 4

```
ComputeRecoveryDecision({FailedEntities})
// FailedEntities: set of failed entities
// Tdef: remaining init time deferred recovery
// Timm: remaining init time immediate
// recovery
1. estimate Tdef for {FailedEntities};
2. estimate Timm for {FailedEntities};
3. if (Timm ≤ Tdef)
      choose immediate recovery;
   else
      choose deferred recovery;
```

FIG. 5

```
// Dependable initialization algorithm
// entry point
//
// G = G(v,e): interdependency graph
// Ei: an entity that has failed.  Could be
//     a processor, process, or component
// Pj: a process
// Failed: set of failed entities
DependableInitialization()
1.  construct interdependency graph G;
    // Typically achieved through some form
    // of configuration file describing
    // application software architecture,
    // initialization tasks, and
    // dependencies
2.  ∀ tasks Ti that have no dependencies
2.1.   trigger execution of Ti;

// Task completion notification: invoked when
// task Ti completes
TaskCompletionNotification(Tj)
1.  G(v) := G(v) - Tj;
2.  G(e) := G(e) - outgoing arcs from Tj;
3.  if G(v) = ϕ
3.1.   initialization is complete;
4.  ∀ tasks Ti that have no dependencies
4.1.   if (Ti.State = WAIT_FOR_RECOVERY)
4.1.1.    decision := ComputeRecoveryDecision(Failed);
4.1.2.    if (decision = immediate recovery)
4.1.2.1.     kill Pj corresponding to Ti;
4.1.2.2.     FailureNotification(Pj);
4.2.   else
4.2.1.    // No need to wait for recovery
4.2.2.    trigger execution of Ti;

FailureNotification(Ei)
1.  Failed := Failed ∪ Ei and all sub-entities;
2.  decision := ComputeRecoveryDecision(Failed);
3.  if (decision = immediate recovery)
3.1.   if Ei is a component, kill Pj corresponding to Ei;
3.2.   G := ComputeRecoveryGraph(G,Failed);
3.3.   ∀ tasks Ti ∈ G that have no dependencies
3.3.1. trigger execution of Ti;
4.  else
4.1.   // Defer recovery.
4.2.   ∀ tasks Ti ∈ Ei
4.2.1. Ti.State := WAIT_FOR_RECOVERY;
```

FIG. 6

METHODS AND DEVICES FOR RECOVERING FROM INITIALIZATION FAILURES

BACKGROUND OF THE INVENTION

Initialization refers to the procedure of starting up a system and bringing the system to a point in its operation where it can begin performing its normal functions. In known distributed software applications, an overall software-based process/application may be separated into a number of software components that are distributed among a plurality of processors interconnected via a network. Each component performs some portion of the functionality of the overall software application.

For a system that consists of a single software component operating in isolation, initializing the system is a simple procedure. However, as the number of system components and their interaction increases, initialization becomes complex due to interdependencies between system components. An "interdependency" is a relationship between two or more components. When two components are interdependent, their initialization must be properly coordinated. A key challenge for a system consisting of multiple components is to initialize the system as quickly as possible while at the same time satisfying such interdependencies. For large-scale distributed systems consisting of hundreds or even thousands of components (such as those encountered in grid computing), this is especially important. A failure to appreciate the complex nature of the interdependences involved by, for example, initializing components one at a time, could result in an initialization time that takes too long to complete.

Further complicating matters is the fact that a failure may occur during initialization. Restarting an entire initialization procedure from the beginning may not be desirable because of the lengthy initialization times needed by various system components. Conversely, restarting and reinitializing only components that failed may not lead to a successfully initialized system because those components that did not fail (so-called "fault-free" components) may depend on a failed component, thus preventing initialization. For example, if a failed component is restarted, an interdependent fault-free component may need to re-establish new communication channels with the restarted component.

So-called fault tolerance techniques (e.g., rollback recovery) may be used to recover from failures that occur during initialization. In rollback recovery, each software component performs frequent periodic check pointing of its state and stores the state in a stable storage area. Upon failure of the software component, a backup software component accesses the stored state information. It is assumed that the most recent copy is correct. However, the state information may have changed since the last check pointing before the failure occurred. To overcome this problem, software components are continuously interrupted during normal operation in order to save their associated state information. Frequent periodic check pointing of software components, however, wastes time and resources, adds extra complexity to a system and imposes performance limitations. While a rollback recovery approach may be feasible in some cases, other techniques appear to be more promising.

Another technique uses characteristics unique to initialization to optimize recovery. For example, because all state information introduced into a component during initialization is either derived from hard-coded or other persistent information, such as configuration information stored in a database, or is determined from actions that take place during initialization (e.g., obtaining the handle to a communication channel involving another component), this state information can easily be recreated should the component fail. However, in some cases the recreated state information may be different from the original. Hence, preserving this state information (e.g., via checkpointing) is not required. Nonetheless, undo operations (e.g., closing a broken communication channel) are still required.

In sum, it is desirable to provide for techniques that provide for quick recovery from initialization failures.

It is also desirable to provide for techniques that take advantage of characteristics unique to initialization in order to provide for quick recovery from initialization failures.

SUMMARY OF THE INVENTION

We have discovered techniques that optimize recovery from initialization failures by exploiting characteristics unique to initialization. In accordance with the present invention, one such technique involves a method for recovering from an initialization failure by generating a so-called recovery graph to identify a set of initialization tasks to execute or re-execute. The recovery graph may be generated based on types of dependencies present in a so-called interdependency graph and in execution states of initialization tasks.

In addition, the present invention also provides methods for determining whether to immediately initiate recovery from an initialization failure or defer such recovery to realize a faster initialization time.

BRIEF DESCRIPTION OF THE DRAWINGS

FIG. 3 depicts an example of a process for generating a recovery graph according to one example of the present invention.

FIGS. 4(*a*), 4(*b*) and 4(*c*) depict examples of how a recovery strategy may impact an overall system initialization time according to one example of the present invention.

FIG. 5 depicts an example of a recovery decision process according to one example of the present invention.

FIG. 6 depicts an example of a dependable initialization process according to one example of the present invention.

DETAILED DESCRIPTION OF THE INVENTION, WITH EXAMPLES

Figure 1:
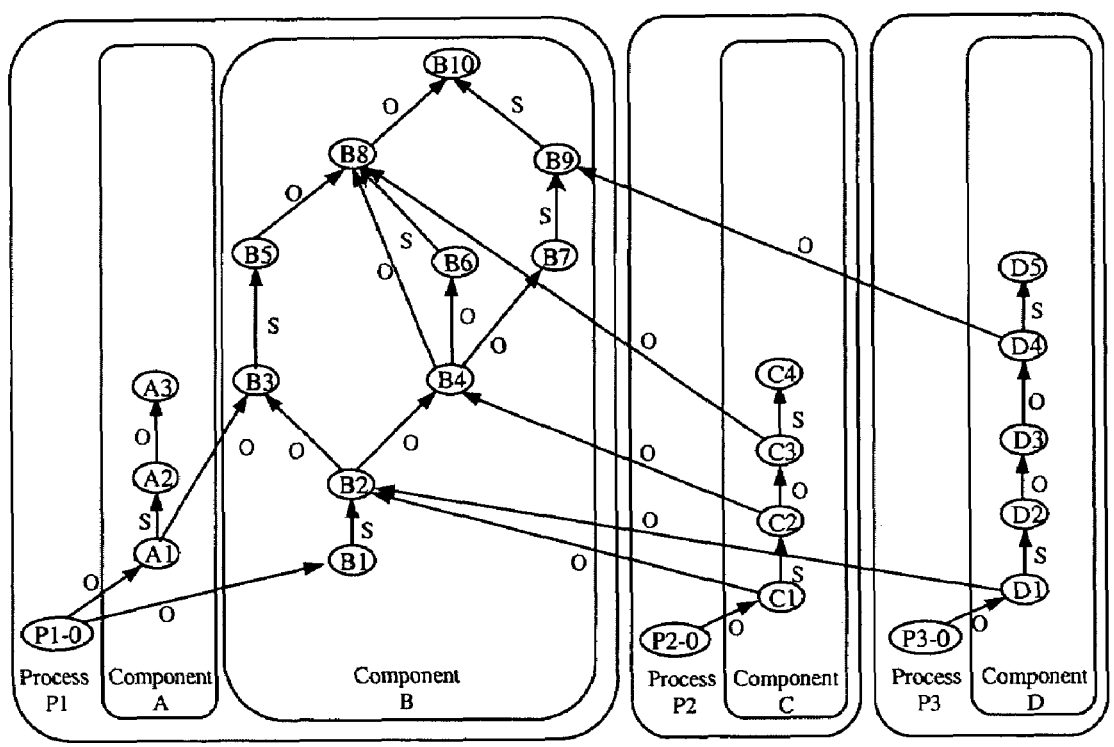
FIG. 1 depicts an example of an interdependency graph according to one example of the present invention.

We have recognized that a technique which exploits characteristics unique to utilization leads to optimum recovery from initialization failures. First, a model of the architecture of a system to be initialized, including the interdependencies among the system's components is generated. Based on this model, some initialization tasks may be skipped during recovery. This greatly reduces recovery overhead and results in faster initialization. Next, the technique dynamically assesses, based on current initialization conditions, whether or not to defer, or immediately enable, recovery from an initialization failure. This allows initialization to be completed faster, in some cases, even though recovery is deferred.

In one embodiment of the present invention, a model of the hardware and software components of a distributed system may be generated. In such a model the hardware components may be represented as one or more processors interconnected via a communication network, while software is modeled as a collection of processes (e.g., sub-entities of a process) that is executed by the processors. As used herein, the term "process" means the smallest executable unit that can be started from within an operating system shell. Each process in turn may contain one or more application components. Components are the smallest unit of initialization and recovery. To ease the reader's understanding of the present invention, it will be assumed that each component has exactly one dedicated thread of execution though the invention is not limited to such bounds.

In a further embodiment of the present invention, interdependencies among components are determined by decomposing initialization into a collection of interdependent units, which may be referred to as tasks. By doing so, independent initialization tasks that can be executed in parallel can be easily identified, which helps to minimize the overall time it takes to initialize the system.

In another embodiment of the present invention, a central controller, control device, coordinator or the like may be operable to carry out the features and functions of the methods, processes and algorithms disclosed herein including synchronizing initialization and recovery. The controller may be further operable to: construct an initialization graph that contains a system's processors, processes, components, tasks and their interdependencies; trigger the execution of tasks; and receive notifications once such tasks are completed, among other things.

To simplify things even further, assumptions concerning initialization failures are initially used to introduce the concepts of the present invention. Specifically, it is assumed that processors and processes fail by crashing ("silent failures") and that application components fail either by crashing or by not responding (e.g., due to deadlocks, etc.).

The failure of a process may be modeled as a failure of all of the components. Similarly, the failure of a processor may be modeled as a failure of all of the components within all processes executing on the processor. It may also be assumed that the communication network does not fail during system initialization and that failure detection is accurate. Again, it should be noted that the assumptions above are made only to simplify the discussion of the present invention which follows.

As mentioned briefly above, in one embodiment of the present invention, initialization dependencies may be determined using an interdependency graph, i.e., a directed acyclic graph with an arc connecting an initialization task $T_i$ to another initialization task $T_j$ if there is a dependency of $T_j$ on $T_i$. This implies that $T_i$ must be executed before $T_j$ can be executed. $T_i$ may be referred to as the parent of $T_j$, and $T_j$ the child of $T_i$. In cases where a task $T_j$ has multiple dependencies, all tasks on which $T_j$ depends must be completed before $T_j$ can be executed. It should be noted that this allows dependencies, within and between components contained in the same or different processes running on the same or different processors, to be modeled/determined.

A dependency between tasks identifies a sequence in which the tasks must be executed. If no failures occur, a correct initialization sequence may be achieved by executing a "child" task as soon as all of its "parent" tasks have executed. Independent tasks may be executed in parallel. To account for the fact that recovery does not require some initialization tasks to be re-executed, different types of dependencies need to be distinguished. For the sake of simplicity, only two types of dependencies are identified: sequential dependencies and operational dependencies.

A sequential dependency of task $T_j$ on task $T_i$ means that task $T_j$ cannot be executed before task $T_i$ is completed. It is not required that the component associated with task $T_i$ remain failure-free during the execution of Task $T_j$. For example, $T_i$ may write data to a permanent storage that is subsequently accessed by $T_j$. Should the component associated with task $T_i$ fail during execution of task $T_j$, $T_j$ can continue its execution, i.e., continue accessing data, assuming that the data on the permanent storage is not corrupted.

An operational dependency of task $T_j$ on task $T_i$ means that task $T_j$ cannot be executed before task $T_i$ is completed as well. However, in addition, the component that is associated with task $T_i$ must remain failure-free during the execution of task $T_j$.

For example, a task $T_i$ may populate a specific region of memory that is accessed by task $T_j$. If the component associated with task $T_i$ fails during execution of task $T_j$, it is possible that the contents of the memory region populated by $T_i$ may be corrupted. For these types of dependencies, recovery actions will require re-executing $T_i$ before $T_j$ is re-executed.

Graphically, the tasks may be represented as nodes in an interdependency graph, with dependencies represented as arcs. The label "S" may be placed on an arc to indicate a sequential dependency, while an "O" represents an operational dependency.

An example of a so-labeled graph is shown in FIG. 1.

For the sake of convenience, each task may also be labeled with an identifier that represents a unique initialization task for a specific entity (component or process). The shaded boxes represent fault containment boundaries within which components may fail on their own. That is, any failure of a task that occurs, occurs within a given shaded box. By "fault containment boundaries", is meant that any task, etc. that fails within a given shaded box does not cause a task, etc. outside that shaded box (e.g., things in other shaded boxes) to fail. A process failure implies that all of its components have failed, while a processor failure implies that all processes executing on a processor have failed.

FIG. 1 depicts a small system consisting of three processes, and four components (for simplicity we do not show the processors). As shown, components A and B are a part of process P1, component C a part of process P2, and component D a part of process P3.

In FIG. 1, process P1-0 may create task P1 while components A and B are created by task P1-0. When this is the case, then it can be seen that task P1-0 must be executed before tasks A1 and B1. In addition, in a practical system a failure of component A might require restarting process P1, indicating there must be an operational dependency between tasks P1-0 and A1. Once task A1 has been executed, task A2 can be executed. If task A2 only depends on the successful execution of task A1 and not on any data generated by task A1, then the type of dependency between tasks A1 and A2 is a sequential dependency.

In another embodiment of the present invention, an interdependency graph may be used to derive a new sequence of initialization activities that enables an efficient recovery from failures that occur during initialization.

For the most part, all tasks associated with entities (e.g., components) that fail must be re-executed. For those entities that remain fault-free, the types of dependencies in an associated, generated interdependency graph identify those additional initialization tasks which are impacted by a failure.

The challenge lies not in identifying initialization tasks impacted by a failure, but in identifying the set of initialization tasks already completed or in progress that must be re-executed. To do so, the present invention provides for the generation of a recovery graph. A recovery graph is a recomputed interdependency graph that contains initialization tasks that must be executed or re-executed in the event of an initialization failure in order to complete an initialization process. A recovery graph is generated dynamically based on the types of dependencies present in an interdependency graph as well as the execution state of initialization tasks.

A recovery graph includes all initialization tasks associated with failed entities and already-completed tasks (to be re-executed) provided: (1) the already-completed tasks have operational dependencies on tasks associated with failed entities, and (2) there exist operational dependencies on these already-completed tasks by initialization tasks that are being executed or that need to be re-executed. Partially completed tasks may be added to the recovery graph if they have operational dependencies on tasks that need to be re-executed. Current execution of these partially completed tasks may be stopped and any cleanup operation performed so that these tasks can later be re-executed. Next, all initialization tasks not yet executed plus those tasks in progress that have no operational dependencies on any of the tasks already in the recovery graph may be added to the recovery graph. Dependencies among tasks that appear in a recovery graph may be the same as those specified in an original interdependency graph.

As with interdependency graphs, recovery graphs may be generated by a controller or the like.

Figure 2:
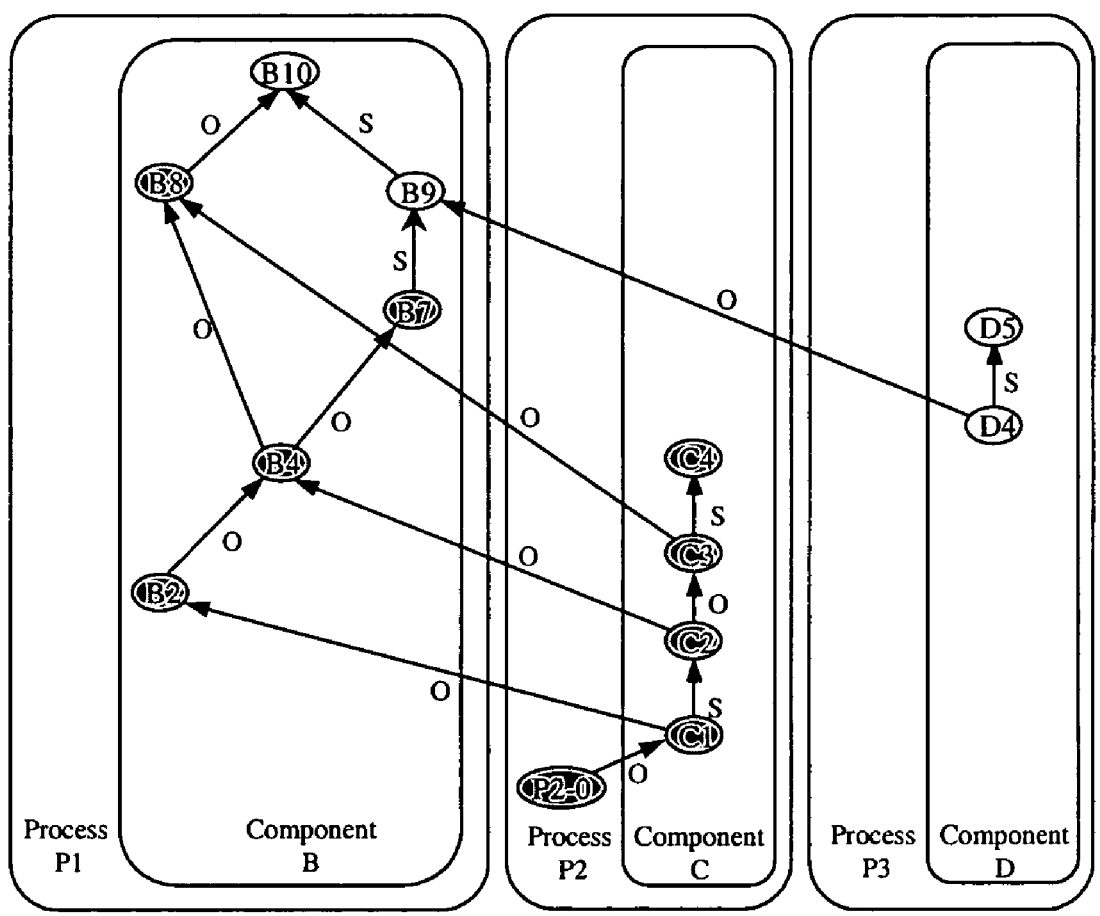
FIG. 2 depicts an example of a recovery graph according to one example of the present invention.

FIG. 1 can be used to illustrate an example of such behavior. Suppose component A has completed executing task A3, component B is executing tasks B7 and B8 (in parallel), component C has completed executing task C4, and component D is presently executing task D4. Suppose further that process P2 containing component C fails. All tasks associated with P2 and all tasks associated with component C become part of a recovery graph. It may be seen that currently-executing task B7 has an operational dependency on B4, and B4 an operational dependency on C2 of failed component C. Therefore, B4 must be added to the recovery graph. In addition, B4 has an operational dependency on B2, and B2 an operational dependency on C1 of failed component C. Hence, B2 must also be added to the recovery graph. Further, B7 has an operational dependency on a task B4 that is in the recovery graph. Thus, B7 must be placed in the recovery graph and needs to be re-executed. A similar procedure may identify in-progress task B8 as requiring re-execution. Hence it must also appear in the recovery graph. Note that while B8 has an operational dependency on B5, B5 does not depend on tasks associated with a failed entity. B5, therefore, does not need to be re-executed and does not need to appear in the recovery graph. A similar situation governs B3. D4 does not have an operational dependency on tasks in the recovery graph; its execution is allowed to continue to completion. Unexecuted tasks B9, B10, and D5, along with in-progress task D4 are added to the recovery graph. FIG. 2 shows an example of a resulting recovery graph. The shaded tasks represent those that must be re-executed.

An algorithm or process for generating a recovery graph (e.g., ComputeRecoveryGraph) is shown in FIG. 3, according to one embodiment or example of the present invention. This process contains four steps.

Step 1 adds all initialization tasks associated with failed entities (e.g., components) into the recovery graph.

In Step 2.1, already-executed tasks in a path (e.g., a path that starts at a failed task (node), and includes operational dependencies (arcs) to other tasks, and so on, until the path reaches a task that is either in progress or has not yet executed) are added into the recovery graph.

Step 3 adds those tasks either in-progress or not executed into the graph (e.g., nodes) while Step 4 adds dependencies into the recovery graph by "copying" them from an original interdependency graph (e.g., connecting links).

In general, it can be said that the goal of dependable initialization is to successfully bring a distributed system, as quickly as possible, to a point where it can begin to perform its normal functions, even in the presence of failures. One way to handle failures is to trigger recovery as soon as failures are detected. However, as discovered by the present inventors, in a distributed system with interdependencies among tasks, an immediate recovery versus a deferred recovery may actually lead to longer initialization times. FIGS. 4(a), 4(b) and 4(c) depict examples of how a recovery strategy may impact an overall system initialization time.

As shown, components A and B may be executed within process P1, while component C may be executed within process P2. Initialization may be considered complete once A2, B2, and C2 have all been completed.

Suppose that the execution times (i.e., the time it takes for a task to complete its function) for tasks P1-0 and P2-0 within processes P1 and P2 are negligible, tasks A1, B1, and C1 take ten seconds each, tasks A2 and B2 require two minutes, and task C2 takes eight minutes. Further suppose that failure detection may take five seconds and that a component may be recovered by restarting the process in which the component is contained (this takes negligible time, but all of the components must re-execute all of their initialization tasks), and that all components are created in parallel simultaneously. Suppose further, at t=9:05 minutes, component A fails when C2 is using B's services.

Consider the interdependency graph shown within FIG. 4(a) generated based on the above parameters. If the failure of component A is detected at 9:10 minutes, five seconds after the failure occurs, and if recovery actions are started immediately, process P1 will be terminated and then restarted. Because task C2 operationally depends on task B1, C2 must be stopped, and will be re-executed once task B1 has re-executed. The shaded ovals identify which tasks were being executed when component A failed.

FIG. 4(b) shows a generated recovery graph for the interdependency graph and scenario in FIG. 4(a) according to an embodiment of the present invention where recovery is initiated immediately. This leads to an overall initialization time of 19:20 minutes.

In contrast, deferring recovery activities until C1 finishes utilizing B's services at 10:10 minutes leads to an overall initialization time of 12:20 minutes, seven minutes less than total initialization time with immediate recovery. The shaded ovals in FIG. 4(c) identify the set of tasks that must be re-executed as part of recovering from the failure of component A.

The above examples illustrate that deferring recovery may in some cases lead to a faster system initialization time than if recovery is undertaken immediately. Intuitively, this makes sense in cases where: (a) multiple components co-exist within the same process, (b) some but not all of these components fail, (c) there are dependencies on fault-free components within a process, and (d) the execution times of currently executing and/or already-executed initialization tasks of fault-free components have a (relatively-speaking) long duration. Because these tasks must be re-executed during recovery, an immediate recovery scenario would delay progress of other initialization tasks.

To achieve the fastest possible initialization time for a system at any given time, it is important to determine which recovery strategy to use. In accordance with yet a further embodiment of the present invention, a recovery decision function that dynamically assesses, based on current initialization conditions, whether or not recovery actions should be taken immediately or deferred may be used to make such determinations.

Given a prior knowledge of the execution time of each task $T_i$ (or otherwise identifying them), in one embodiment of the present invention, a recovery decision function may be invoked to estimate the remaining initialization times associated with each of the two strategies (i.e., immediate versus deferred) when a failure occurs. The a priori knowledge will typically be estimates of execution times for each task, as there are a number of factors in real systems that make it difficult to guarantee actual execution time. The estimates may be updated based on a history of past execution times. Next, the strategy that provides the smaller overall, expected remaining initialization time may be selected.

An example of a recovery decision algorithm or process is shown in FIG. 5, where $T_{imm}$ represents the expected remaining initialization time using an immediate recovery strategy and $T_{def}$ represents the expected remaining initialization time using a deferred recovery strategy. If $T_{imm} \leq T_{def}$, immediate recovery is chosen; otherwise, deferred recovery is selected. For both strategies, the remaining initialization time includes: (i) the time spent recovering failed entities, (ii) the time spent re-executing impacted tasks in non-faulty components and (iii) the time spent on remaining initialization tasks associated with non-faulty components. The time required to execute each component's task can be identified either from a task execution history or from application developers' specifications. An estimation of the remaining initialization time may be based on a recovery graph generated from a dependable initialization model.

The present invention also provides techniques for estimating the expected remaining initialization time, $T_{imm}$. In yet a further embodiment of the present invention, a recovery graph $G_{imm}$ may be generated by invoking the previously-introduced ComputeRecoveryGraph algorithm to estimate $T_{imm}$. The remaining initialization time $t(n_i)$ for each component $n_i$ in $G_{imm}$ may then be calculated. The maximum initialization time, $t(n_i)$ may then be computed and then be used to compute $T_{imm}$: $T_{imm}=\max(t(n_i), \forall n_i \in G_{imm}$.

To determine $T_{def}$, tasks that are currently using services provided by non-faulty components in processes (denoted as $\{P_f\}$) containing faulty components are first identified. These tasks may be referred to as "clients" of the faulty processes $\{P_f\}$. For each so-identified client, denoted $c_i$, the remaining time $t(c_i)$ for $c_i$ to complete the execution of its current tasks is determined. Assuming that recovery actions begin once each client has finished using the services provided by $\{P_f\}$, a corresponding second recovery graph $G_{def}$ may be generated containing the identified tasks/clients and tasks that have already executed which need to be re-executed as a result of a failure. The remaining initialization time $t(n_i)$ for each component $n_i$ in $G_{def}$ may then be calculated, and from this, a maximum initialization time for a deferred recovery, $T_{def}$ is computed: $T_{def}=\max(t(n_i), \forall n_i \in G_{def})+\max(t(c_i), \forall c_i \in$ clients of $\{P_f\})$. $T_{def}$ is the maximum time it takes for any of the "client" tasks to be completed plus the time it takes to re-execute tasks as a result of failures that have occurred. It should be noted that the recovery decision itself takes negligible time to compute.

The recovery decision-making process may be further illustrated by applying it to the examples illustrated in FIGS. 4(a) and 4(b).

For example, a recovery decision function may be invoked when the failure of component A is detected at 9:10 minutes. Under such a situation, $T_{imm}$ is determined to be 10:10 minutes, and $T_{def}$ 3:10 minutes. Thus, the deferred recovery scheme should be chosen.

Referring now to FIG. 6, there is depicted an example of a dependable initialization algorithm/process according to the present invention that uses both a dependable initialization model and a recovery decision function according to a further embodiment of the present invention.

The algorithm first generates an interdependency graph G that includes initialization tasks by, for example, using the dependable initialization model described above. Whenever a failure is reported (by invoking, for example, a FailureNotification function shown in FIG. 6), a ComputeRecoveryDecision routing program may be requested/utilized to determine the recovery strategy that would minimize overall initialization time. If immediate recovery is preferred, processes associated with failed components are terminated, a recovery graph is computed, and initialization continues using the recovery graph. If recovery is deferred, certain tasks may be placed "on hold" (e.g., using a WAIT_FOR_RECOVERY instruction shown in FIG. 6). Thereafter, a determination as to whether or not recovery should continue to be deferred may be made each and every time an executing task completes. In this way, the present invention dynamically assesses when to trigger recovery actions based on current and remaining system initialization tasks. Finally, initialization activities associated with system initialization tasks are triggered and coordinated.

The sequential and operational dependency types presented above are only two of many types of dependencies that may be important to initialization that may, or may not, be a part of a recovery graph. An additional dependency is one that specifies a relationship between active and standby components. Such a dependency is referred to as a fail-over dependency, defined as follows.

A fail-over dependency of task $T_j$ on task $T_i$ specifies that $T_j$ can only execute after $T_i$ has failed (effectively, the component associated with $T_j$ is promoted). This type of dependency may be represented in an interdependency graph by an arc from task $T_i$ to task $T_j$ labeled with an "F". Task $T_j$ will not be executed until the component associated with $T_i$ fails. The recovery graph that is created as a result of the failure of the component associated with $T_i$ may include task $T_j$ and all of its associated dependencies. It may also include a new standby component with the same set of dependencies as existed between the original active and standby components.

Other dependency types include non-essential dependencies (where a component is not required for initialization to complete—the challenge is to determine what to do when a non-essential component becomes available partway through the initialization procedure), unmanaged dependencies (i.e., dependencies on resources not managed by an initialization coordinator), dependencies related to fault escalation (e.g., once recovery attempts during initialization fail, a more drastic recovery attempt is needed), etc. Also, events other than failures impact initialization, such as a processor becoming available during initialization.

The above discussion has attempted to set forth some examples of the present invention. However, it should be understood, that the true scope of the present invention is given by the claims which follow.

We claim:

1. A method for determining whether to immediately initiate recovery from an initialization failure or defer such recovery comprising:

identifying execution times for each initialization task;

estimating remaining initialization times associated with an immediate recovery scenario and a deferred recovery scenario; and selecting the scenario that provides the smaller, overall initialization time.

2. A method for estimating an expected, remaining initialization time comprising:

generating a first recovery graph;

calculating a remaining initialization time for each component within the graph;

computing a first maximum initialization time as an immediate recovery time;

identifying tasks currently using services provided by non-faulty components;

determining a remaining time for each identified task to complete execution;

generating a second recovery graph containing the identified tasks;

calculating a remaining initialization time for each component in the second graph; and computing a second maximum initialization time as a deferred recovery time.

3. A device for recovering from an initialization failure operable to:

generate a recovery graph of dependencies to identify a set of initialization tasks to execute or re-execute in the event of an initialization failure;

identify execution times for each initialization task;

estimate remaining initialization times associated with an immediate recovery scenario and a deferred recovery scenario; and select the scenario that provides the smaller, overall initialization time.

* * * * *